(12) United States Patent
Abusleme et al.

(10) Patent No.: US 7,855,254 B2
(45) Date of Patent: Dec. 21, 2010

(54) THERMOPLASTIC FLUOROPOLYMER COMPOSITION

(75) Inventors: Julio A. Abusleme, Saronno (IT); Claudia Manzoni, Bologna (IT); Giambattista Besana, Mariano Comense (IT)

(73) Assignee: Solvay Solexis S.p.A., Milan (IT)

( * ) Notice: Subject to any disclaimer, the term of this patent is extended or adjusted under 35 U.S.C. 154(b) by 6 days.

(21) Appl. No.: 11/912,250

(22) PCT Filed: Apr. 25, 2006

(86) PCT No.: PCT/EP2006/061805

§ 371 (c)(1),
(2), (4) Date: Oct. 22, 2007

(87) PCT Pub. No.: WO2006/114411

PCT Pub. Date: Nov. 2, 2006

(65) Prior Publication Data

US 2008/0161481 A1    Jul. 3, 2008

(30) Foreign Application Priority Data

Apr. 26, 2005    (EP)    ................... 05103349

(51) Int. Cl.
*C08L 27/12* (2006.01)
(52) U.S. Cl. .................. 525/199; 525/200; 524/501; 524/520; 524/544; 524/545; 524/546; 526/242; 526/247; 526/253; 526/255
(58) Field of Classification Search .................. 525/199, 525/200; 524/501, 520, 544, 545, 546; 526/255
See application file for complete search history.

(56) References Cited

U.S. PATENT DOCUMENTS 4,423,192 A    12/1983    Van Lang et al.

(Continued)

FOREIGN PATENT DOCUMENTS

EP    0 373 588    6/1990

(Continued)

OTHER PUBLICATIONS

U.S. Appl. No. 11/995,428, filed Jan. 11, 2008, Abusleme, et al.

(Continued)

*Primary Examiner*—David Wu
*Assistant Examiner*—Nicole M Buie-Hatcher
(74) *Attorney, Agent, or Firm*—Oblon, Spivak, McClelland, Maier & Neustadt, L.L.P.

(57) ABSTRACT

The invention pertains to a multi-phase thermoplastic fluoropolymer composition, comprising a thermoplastic fluoropolymer and discrete domains of melt-processable perfluoropolymer, to the articles therefrom and to a process for manufacturing thermoplastic fluoropolymer compositions. The multi-phase thermoplastic fluoropolymer composition comprises: —at least one thermoplastic fluoropolymer (A); and —from 0.1 to 10% by weight of (A) of at least one melt-processable perfluoropolymer (B), and is characterized in that the polymer (B) is present in the composition in phase-separated domains in a continuous phase mainly comprising (A), at least 75% by volume of said domains having maximal dimension not exceeding 1 μm. The process of the invention comprises mixing: (i) a thermoplastic fluoropolymer (A); (ii) a melt-processable perfluoropolymer (B) under the form of particles having an average primary particle size not exceeding 300 nm; (iii) and optionally other additives or filling materials.

23 Claims, 6 Drawing Sheets

U.S. PATENT DOCUMENTS

2003/0198769 A1   10/2003   Jing et al.
2005/0032968 A1*   2/2005   Drujon et al. ............... 524/515

FOREIGN PATENT DOCUMENTS

| | | |
|---|---|---|
| EP | 0 606 493 | 7/1994 |
| GB | 1 255 081 | 11/1971 |
| WO | 00/73383 | 12/2000 |
| WO | 03/050183 | 6/2003 |

OTHER PUBLICATIONS

U.S. Appl. No. 11/995,374, filed Jan. 11, 2008, Abusleme, et al.

* cited by examiner (4a)

(4b)

(5a)

(5b)

THERMOPLASTIC FLUOROPOLYMER COMPOSITION

This application is a 371 of PCT/EP06/61805, filed Apr. 25, 2006.

The invention pertains to a multi-phase thermoplastic fluoropolymer composition, comprising a thermoplastic fluoropolymer and discrete domains of melt-processable perfluoropolymer, to the articles therefrom and to a process for manufacturing thermoplastic fluoropolymer compositions.

Fluorocarbon resins, in particular vinylidene fluoride resins, are well known for their outstanding mechanical properties within a broad range of temperature, excellent resistance to high temperature, organic solvents and to various chemically aggressive environments.

Thanks to their properties they are commonly used for manufacturing articles by extrusion or injection molding, e.g. for producing pipes, tubes, fittings, films, coatings, cable sheathings, flexible pipes and the like.

To further improve mechanical properties of these polymers, it is well known to increase their molecular weight, or, in other words, to increase their melt viscosity. Thus, although fluoropolymer of high molar mass (and thus high melt viscosity) are preferable because of improved mechanical properties, processing these materials is more difficult. In particular, in extrusion process, they display rheology problems, accounting for increased energy consumption during extrusion and more severe extrusion conditions to be applied (with consequent risks of thermal degradation of the polymer). In this case, finished parts (extrusion or injection molded) made from these fluoropolymer have generally surface defects like cracks, shark-skin, fish-eyes and the like.

Processing aids have been thus largely used to obviate these problems; nevertheless, they have several drawbacks. Due to their limited thermal stability at processing temperature, benefits of their addition are lost and fumes are released during processing; thermal degradation residues generate in final parts structural defects and voids that can be detrimental to mechanical properties.

Perfluoropolymers have been thus employed to aid the extrusion processes and improve the final surface characteristics of the extrudate.

Thus, U.S. Pat. No. 4,423,192 discloses lubricated polyvinylidene fluoride compositions comprising from 0.1 to 10% by weight of tetrafluoroethylene homopolymers or copolymers containing at least 90 mole percent of tetrafluoroethylene groups of low molecular weight.

GB 1255081 discloses vinylidene fluoride polymer compositions comprising high-molecular weight tetrafluoroethylene homopolymers or normally solid high-molecular weight copolymers of tetrafluoroethylene containing at least 90 mole percent of tetrafluoroethylene units.

WO 03/050183 discloses, inter alia, melt processable fluorothermoplastic compositions comprising a major amount of a first semi-crystalline fluorinated copolymer and a minor amount of a second fluoropolymer effective to reduce melt defects in the compositions.

Finally, US 2003/0198769 discloses fluoropolymer blends combinations comprising a partially-fluorinated thermoplastic polymer and a perfluorinated thermoplastic polymer.

Despite these attempts, there is always a great need for composition wherein a uniform dispersion of the perfluoropolymer acting as processing aid is achieved. When mixing the processing aid with the matrix in the composition of the prior art, phase-separated domains of large size are obtained: this uneven distribution prevents the perfluoropolymer to efficiently improve processing. Thus this approach fails to provide the targeted advantages, and, notwithstanding the addition of the processing aid, it is not possible to process the composition materials at higher output rates while maintaining satisfactory quality in final parts finish and keeping good mechanical properties.

This invention thus aims at providing a multi-phase thermoplastic fluoropolymer composition in which the efficiency of the perfluoropolymer as processing aid in improving rheological behavior is increased and in which the mechanical properties are not negatively affected.

This problem is remarkably solved by the multi-phase thermoplastic fluoropolymer composition of the invention, comprising:

at least one thermoplastic fluoropolymer [polymer (A)]; and from 0.1 to 10% by weight of (A) of at least one melt-processable perfluoropolymer [polymer (B)], characterized in that the polymer (B) is present in the composition in phase-separated domains in a continuous phase mainly comprising polymer (A), at least 75% by volume of said domains having maximal dimension not exceeding 1 μm.

Another object of the invention is a process for manufacturing multi-phase thermoplastic fluoropolymer compositions.

Still objects of the invention are the articles, such as shaped articles, films, cable sheathing, pipes, flexible pipes, hollow bodies comprising the multi-phase thermoplastic fluoropolymer composition.

The addition of a melt-processable perfluoropolymer (B) as discrete domains of small dimension advantageously enables improvement of rheological behavior of thermoplastic fluoropolymer (A), making possible processing in less severe conditions and yielding final parts with outstanding surface aspect and good homogeneity and coherency. Thanks to the melt-processable character of the perfluoropolymer and to its addition as particles of controlled morphology, the polymer (B) advantageously melts during processing assuring optimal distribution within the overall thermoplastic fluoropolymer matrix and enabling discrete domains of small size to be formed.

The process according to the invention is advantageously particularly efficient in assuring optimal distribution of the polymer (B) in the thermoplastic composition, which enables increased efficiency of polymer (B) as processing aid and avoids negative impact on mechanical properties.

Figure 1:
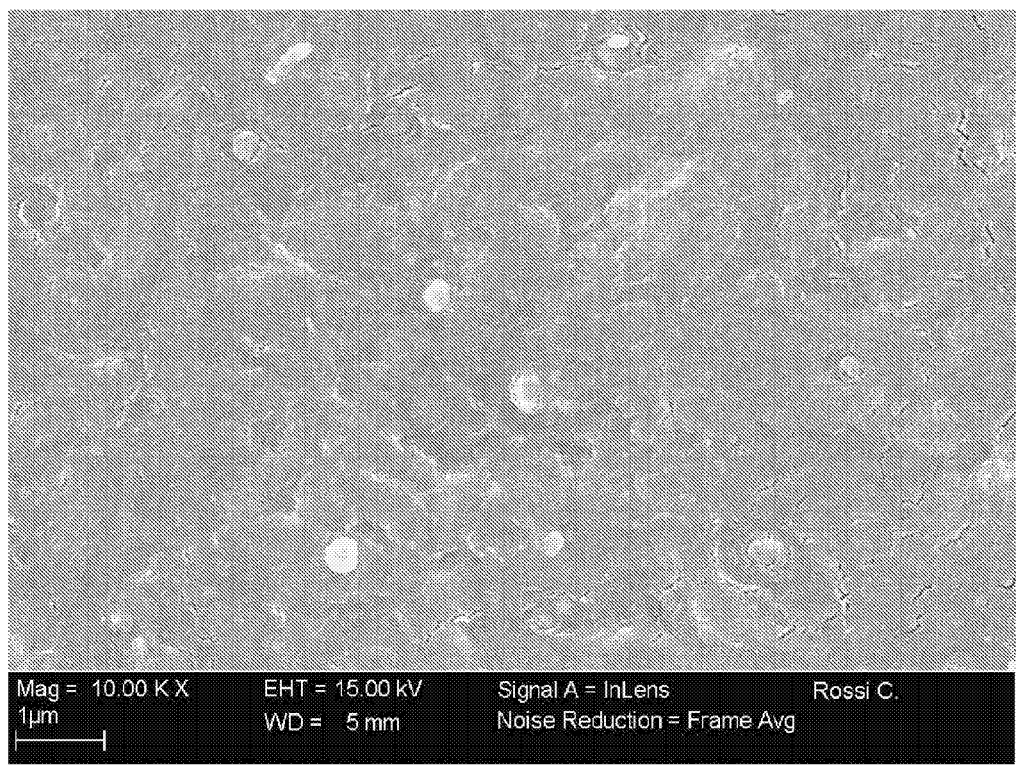
FIG. 1 is a SEM picture (magnification: 10 000×) of a specimen sampled from an extruded pipe of the thermoplastic composition of example 2, after fragile rupture at liquid nitrogen temperature.

The term multi-phase is to be intended to denote a composition wherein the melt-processible perfluoropolymer (B) is immiscible with the thermoplastic fluoropolymer (A), so that the composition possesses phase-separated domains mainly comprising (B) in a continuous phase mainly comprising (A).

For the purpose of the invention, the term "immiscible melt-processible perfluoropolymer (B)" is intended to denote any melt-processible perfluoropolymer (B) yielding a phase-separated composition, when mixed with the thermoplastic fluoropolymer (A) in the composition according to the invention, which shows two distinct glass transition temperatures, when analyzed by Differential Scanning Calorimetry (DSC) at a heating rate of 10° C./min, according to ASTM D 3418.

The term "continuous phase mainly comprising (A)" is intended to denote a continuous phase comprising (A) as major component, i.e. comprising more than 50%, preferably more than 60%, still more preferably more than 75% by weight of (A).

The term "phase-separated domains mainly comprising (B)" is intended to denote a phase comprising (B) as major component, i.e. comprising more than 50%, preferably more than 60%, still more preferably more than 75% by weight of (B).

The term "phase-separated domain" is intended to denote three-dimensional volume element of the composition of the invention, wherein the concentration of (B) is at least 25% higher, preferably 30% higher, still more preferably 50% higher than the concentration of (B) in the continuous phase mainly comprising (A).

The term "maximal dimension" is intended to denote the maximal value of the diameter of a cross-sectional area, associated to each of the possible differently oriented cross-sections of the phase-separated domain.

A cross section is to be intended as the intersection of the phase-separated domain in three-dimensional space with a plane. From a practical point of view, when cutting into slices, many parallel cross sections are obtained.

The diameter of a cross-sectional area is defined as the diameter of the smallest circle which the cross-sectional area can be comprised in.

75% by volume of the phase-separated domains as above specified have a maximal dimension not exceeding preferably 0.75 μm.

Maximal dimension of the phase-separated domains may be preferably determined by SEM microscopy and image recognition on samples of the composition, obtained from microtomic cuts or fractures, realized at liquid nitrogen temperature.

Volume percent of phase-separated domains having maximal dimension not exceeding a relevant value is calculated by measuring surface area of such domains with respect to the total area of domains in the microtomic cut or fracture analysed by SEM microscopy and image recognition.

Within the context of the present invention the mention "at least one thermoplastic fluoropolymer (A)" is intended to denote one or more than one thermoplastic fluoropolymer (A).

The fluoropolymer (A) of the invention should be thermoplastic.

The term "thermoplastic" is understood to mean, for the purposes of the present invention, polymers existing, at room temperature, below their glass transition temperature, if they are amorphous, or below their melting point if they are semi-crystalline, and which are linear (i.e. not reticulated). These polymers have the property of becoming soft when they are heated and of becoming rigid again when they are cooled, without there being an appreciable chemical change. Such a definition may be found, for example, in the encyclopedia called "Polymer Science Dictionary", Mark S. M. Alger, London School of Polymer Technology, Polytechnic of North London, UK, published by Elsevier Applied Science, 1989.

Thermoplastic polymers are thus distinguishable from elastomers.

To the purpose of the invention, the term "elastomer" is intended to designate a true elastomer or a polymer resin serving as a base constituent for obtaining a true elastomer.

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Polymer resins serving as a base constituent for obtaining true elastomers are in general amorphous products having a glass transition temperature ($T_g$) below room temperature. In most cases, these products correspond to copolymers having a $T_g$ below 0° C. and including reactive functional groups (optionally in the presence of additives) allowing the true elastomer to be formed.

Preferably, the thermoplastic fluoropolymer of the invention is semi-crystalline.

The term "semi-crystalline" is intended to denote a polymer having a heat of fusion of more than 1 J/g when measured by Differential Scanning Calorimetry (DSC) at a heating rate of 10° C./min, according to ASTM D 3418.

Preferably, the thermoplastic fluoropolymer of the invention has a heat of fusion of at least 4 J/g, more preferably of at least 8 J/g.

To the purpose of the present invention, "fluoropolymer" is intended to denote any polymer comprising more than 25% wt of recurring units derived from at least one ethylenically unsaturated monomer comprising at least one fluorine atom (hereinafter, fluorinated monomer).

The fluoropolymer comprises preferably more than 30% wt, more preferably more than 40% wt of recurring units derived from the fluorinated monomer.

The fluorinated monomer can further comprise one or more other halogen atoms (Cl, Br, I). Shall the fluorinated monomer be free of hydrogen atom, it is designated as per (halo)fluoromonomer. Shall the fluorinated monomer comprise at least one hydrogen atom, it is designated as hydrogen-containing fluorinated monomer.

Non limitative examples of fluorinated monomers are notably tetrafluoroethylene (TFE), vinylidene fluoride (VdF) and chlorotrifluoroethylene (CTFE).

Optionally, the fluoropolymer may comprise recurring units derived from one first monomer, said monomer being a fluorinated monomer as above described, and recurring units derived from at least one other monomer (the comonomer hereinafter).

The comonomer can notably be either hydrogenated (i.e. free of fluorine atom) or fluorinated (i.e. containing at least one fluorine atom).

Non limitative examples of suitable hydrogenated comonomers are notably ethylene, propylene, vinyl monomers such as vinyl acetate, acrylic monomers, like methyl methacrylate, acrylic acid, methacrylic acid and hydroxyethyl acrylate, as well as styrene monomers, like styrene and p-methylstyrene.

Non limitative examples of suitable fluorinated comonomers are notably:

$C_3$-$C_8$ perfluoroolefins, such as hexafluoropropene;

$C_2$-$C_8$ hydrogenated monofluoroolefins, such as vinyl fluoride;

1,2-difluoroethylene and trifluoroethylene;

perfluoroalkylethylenes complying with formula $CH_2=CH-R_{f0}$, in which $R_{f0}$ is a $C_1$-$C_6$ perfluoroalkyl;

chloro- and/or bromo- and/or iodo-$C_2$-$C_6$ fluoroolefins, like chlorotrifluoroethylene;

(per)fluoroalkylvinylethers complying with formula $CF_2=CFOR_{f1}$ in which $R_{f1}$ is a $C_1$-$C_6$ fluoro- or perfluoroalkyl, e.g. $CF_3$, $C_2F_5$, $C_3F_7$;

$CF_2=CFOX_0$ (per)fluoro-oxyalkylvinylethers, in which $X_0$ is a $C_1$-$C_{12}$ alkyl, or a $C_1$-$C_{12}$ oxyalkyl, or a $C_1$-$C_{12}$ (per)fluorooxyalkyl having one or more ether groups, like perfluoro-2-propoxy-propyl;

(per)fluoromethoxyalkylvinylethers complying with formula $CF_2=CFOCF_2OR_{f2}$ in which $R_{f2}$ is a $C_1$-$C_6$ fluoro- or perfluoroalkyl, e.g. $CF_3$, $C_2F_5$, $C_3F_7$ or a $C_1$-$C_6$ (per)fluorooxyalkyl having one or more ether groups, like $-C_2F_5-O-CF_3$;

functional (per)fluoroalkylvinylethers complying with formula $CF_2=CFOY_0$, in which $Y_0$ is a $C_1$-$C_{12}$ alkyl or (per)fluoroalkyl, or a $C_1$-$C_{12}$ oxyalkyl, or a $C_1$-$C_{12}$ (per)fluorooxyalkyl having one or more ether groups and $Y_0$ comprising a carboxylic or sulfonic acid group, in its acid, acid halide or salt form;

fluorodioxoles, especially perfluorodioxoles.

Preferably, the fluoropolymer is a hydrogen-containing fluoropolymer.

By "hydrogen-containing fluoropolymer" it is meant:

polymers comprising recurring units derived from one or more per(halo)fluoromonomers (for instance tetrafluoroethylene, chlorotrifluoroethylene, hexafluoropropylene, perfluoroalkylvinylethers, etc.) and from one or more hydrogenated comonomer(s) (for instance ethylene, propylene, vinylethers, acrylic monomers, etc.); and/or polymers comprising recurring units derived from one or more hydrogen-containing fluorinated monomers (for instance vinylidene fluoride, trifluoroethylene, vinylfluoride, etc.) and, optionally from fluorinated and/or hydrogenated comonomers.

Preferably, the hydrogen-containing fluoropolymer are chosen among:

(A-1) TFE and/or CTFE copolymers with ethylene, propylene or isobutylene (preferably ethylene), with a molar ratio per(halo)fluoromonomer(s)/hydrogenated comonomer(s) of from 30:70 to 70:30, optionally containing one or more comonomers in amounts of from 0.1 to 30% by moles, based on the total amount of TFE and/or CTFE and hydrogenated comonomer(s) (see for instance U.S. Pat. No. 3,624,250 and U.S. Pat. No. 4,513,129);

(A-2) Vinylidene fluoride (VdF) polymers, optionally comprising reduced amounts, generally comprised between 0.1 and 15% by moles, of one or more fluorinated comonomer(s) (see for instance U.S. Pat. No. 4,524,194 and U.S. Pat. No. 4,739,024), and optionally further comprising one or more hydrogenated comonomer(s).

The CTFE or TFE copolymers (A-1) preferably comprise:

(a) from 35 to 65%, preferably from 45 to 55%, more preferably from 48 to 52% by moles of ethylene (E);

(b) from 65 to 35%, preferably from 55 to 45%, more preferably from 52 to 48% by moles of chlorotrifluoroethylene (CTFE) (for the ECTFE copolymers, hereinafter) and/or tetrafluoroethylene (TFE) (for the ETFE copolymers, herein after); and optionally;

(c) from 0.1 to 30%, by moles, preferably 0.1 to 10% by moles, more preferably 0.1 to 5% by moles, based on the total amount of monomers (a) and (b), of one or more fluorinated comonomer(s) (c1) and/or hydrogenated comonomer(s) (c2).

Among fluorinated comonomers (c1) we can for example mention (per)fluoroalkylvinylethers, perfluoroalkylethylenes (such as perfluorobutylethylene), (per)fluorodioxoles as described in U.S. Pat. No. 5,597,880, vinylidenefluoride (VdF). Among them, preferred (c1) comonomer is perfluoropropylvinylether of formula $CF_2=CFO-C_3F_7$.

Among comonomers (c), hydrogenated comonomers (c2) are preferred. As non limitative examples of hydrogenated comonomers (c2), mention may be notably made of those having the general formula:

(I)

wherein $R_1=OR_2$, or $-(O)_tCO(O)_pR_2$ wherein t and p are integers equal to 0, 1 and $R_2$ is a hydrogenated radical $C_1$-$C_{20}$ from 1 to 20 carbon atoms, of alkyl type, linear or branched when possible, or cycloalkyl, optionally containing heteroatoms and/or chlorine atoms, the heteroatoms preferably being O or N, $R_2$ optionally contains one or more functional groups, preferably selected from OH, COOH, epoxide, ester and ether, $R_2$ optionally contains double bonds, or $R_2$ is H, n is an integer in the range 0-10. Preferably $R_2$ is of alkyl type from 1 to 10 carbon atoms containing functional groups of hydroxide type, n is an integer in the range 0-5.

The preferred hydrogenated comonomers (c2) are selected from the following classes:

1) Acrylic monomers having the general formula:

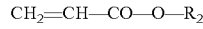

wherein $R_2$ has the above mentioned meaning.

As non limitative examples of suitable acrylic monomers, mention can be notably made of ethylacrylate, n-butylacrylate, acrylic acid, hydroxyethylacrylate, hydroxypropylacrylate, (hydroxy)ethylhexylacrylate.

2) Vinylether monomers having the general formula:

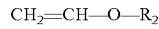

wherein $R_2$ has the above mentioned meaning.

As non limitative examples of suitable vinylether monomers, mention can be notably made of propylvinylether, cyclohexylvinylether, vinyl-4-hydroxybutylether.

3) Vinyl monomers of the carboxylic acid having the general formula:

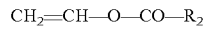

wherein $R_2$ has the above mentioned meaning.

As non limitative examples of suitable vinyl monomers of the carboxylic acid, mention can be notably made of vinyl-acetate, vinylpropionate, vinyl-2-ethylhexanoate.

4) Unsaturated carboxylic acid monomers having the general formula:

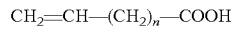

wherein n has the above mentioned meaning. As non limitative example of suitable unsaturated carboxylic acid monomer, mention can be notably made of vinylacetic acid.

More preferred comonomer (c2) is n-butylacrylate.

Among A-1 polymers, ECTFE polymers are preferred.

The melt index of the ECTFE is advantageously at least 0.01, preferably at least 0.05, more preferably at least 0.1 g/10 min.

The melt index of the ECTFE is advantageously at most 50, preferably at most 10, more preferably at most 5 g/10 min, even more preferably at most 1 g/10 min.

The melt index of ECTFE is measured in accordance with modified ASTM test No. 1238, run at 275° C., under a piston load of 5 kg.

The ECTFE has a melting point advantageously of at least 150° C. and at most 265° C.

The melting point is determined by Differential Scanning Calorimetry (DSC) at a heating rate of 10° C./min, according to ASTM D 3418 Standard.

Particularly adapted to thermoplastic halogenated polymer composition of the invention is ECTFE available from Solvay Solexis Inc., Thorofare, N.J., USA, under the tradename HALAR® and VATAR®.

More preferably, the hydrogen-containing fluoropolymer is a VdF polymer (A-2).

The VdF polymers (A-2) preferably comprise:

(a') at least 60% by moles, preferably at least 75% by moles, more preferably 85% by moles of vinylidene fluoride (VdF);

(b') optionally from 0.1 to 15%, preferably from 0.1 to 12%, more preferably from 0.1 to 10% by moles of a fluorinated comonomer chosen among vinylfluoride ($VF_1$), chlorotrifluoroethylene (CTFE), hexafluoropropene (HFP), tetrafluoroethylene (TFE), trifluoroethylene (TrFE), methylvinylether (MVE) and mixtures therefrom; and (c') optionally from 0.1 to 5%, by moles, preferably 0.1 to 3% by moles, more preferably 0.1 to 1% by moles, based on the total amount of monomers (a') and (b'), of one or more fluorinated or hydrogenated comonomer(s).

As non limitative examples of the VdF polymers useful in the present invention, mention can be notably made of homopolymer of VdF, VdF/TFE copolymer, VdF/TFE/HFP copolymer, VdF/TFE/CTFE copolymer, VdF/TFE/TrFE copolymer, VdF/CTFE copolymer, VdF/HFP copolymer, VdF/TFE/HFP/CTFE copolymer, VdF/MVE copolymer, VdF/TFE/perfluorobutenoic acid copolymer, VdF/TFE/maleic acid copolymer and the like.

The melt index of the VdF polymer is advantageously at least 0.01, preferably at least 0.05, more preferably at least 0.1 g/10 min.

The melt index of the VdF polymer is advantageously at most 10, preferably at most 7.5, more preferably at most 5 g/10 min, even more preferably at most 1 g/10 min.

The melt index of VdF polymer is measured in accordance with ASTM test No. 1238, run at 230° C., under a piston load of 5 kg.

The VdF polymer has a melting point advantageously of at least 120° C., preferably at least 125° C., more preferably at least 130° C.

The VdF polymer has a melting point advantageously of at most 190° C., preferably at most 185° C., more preferably at most 180° C.

The melting point ($T_{m2}$) is determined by DSC, at a heating rate of 10° C./min, according to ASTM D 3418.

According to an embodiment of the invention, the polymer (A) is a mixture of at least one VdF homopolymer and at least one VdF copolymer chosen among the group consisting of VdF copolymer comprising from 0.1 to 15%, preferably from 0.1 to 12%, more preferably from 0.1 to 10% by moles of a fluorinated comonomer chosen among vinylfluoride ($VF_1$), chlorotrifluoroethylene (CTFE), hexafluoropropene (HFP), tetrafluoroethylene (TFE), trifluoroethylene (TrFE) and mixtures therefrom.

For the purpose of the invention, the term "perfluoropolymer" is intended to denote a fluoropolymer substantially free of hydrogen atoms.

The term "substantially free of hydrogen atom" is understood to mean that the perfluorpolymer is prepared from monomers free of hydrogen atoms.

For the purposes of the present invention, by the term "melt-processible" is meant that the perfluoropolymer can be processed (i.e. fabricated into shaped articles such as films, fibers, tubes, wire coatings and the like) by conventional melt extruding, injecting or casting means. Such typically requires that the dynamic viscosity at a shear rate of 1 $s^{-1}$ and at a temperature exceeding melting point of roughly 30° C., preferably at a temperature of $T_{m2}+(30\pm2°$ C.), is comprised between 10 and $10^6$ Pa×s, when measured with a controlled strain rheometer, employing an actuator to apply a deforming strain to the sample and a separate transducer to measure the resultant stress developed within the sample, and using the parallel plate fixture.

The melt processible perfluoropolymer has a dynamic viscosity at a shear rate of 1 $s^{-1}$ in the above specified conditions preferably comprised between 10 and 2 000 Pa×s, more preferably between 10 and 700 Pa×s.

The ratio between the melt index of the polymer (B) and the melt index of the polymer (A) is advantageously at least 5, preferably at least 10, more preferably at least 20.

The melt index of polymer (B) is measured in accordance with ASTM test No. 1238.

Non limitative examples of preferred polymer (B) are notably TFE copolymers comprising at least 2% wt, preferably at least 7% wt, and at most 30, preferably at most 25% wt, more preferably at most 23% wt of recurring units derived from at least one fluorinated comonomer chosen among the group consisting of:

(i) perfluoroalkylvinylethers complying with formula $CF_2=CFOR_{f1'}$, in which $R_{f1'}$ is a $C_1$-$C_6$ perfluoroalkyl, e.g. $CF_3$, $C_2F_5$, $C_3F_7$; and/or (ii) perfluoro-oxyalkylvinylethers complying with formula $CF_2=CFOX_0$, in which $X_0$ is a $C_1$-$C_{12}$ perfluorooxyalkyl having one or more ether groups, like perfluoro-2-propoxy-propyl; and/or (iii) $C_3$-$C_8$ perfluoroolefins, such as hexafluoropropylene.

Good results have been obtained with TFE copolymers wherein the fluorinated comonomer is a $C_3$-$C_8$ perfluoroolefin and/or a perfluoroalkylvinylether as above specified; particularly good results have been achieved with TFE copolymers wherein the fluorinated comonomer is hexafluoropropylene (HFP, hereinafter) and/or perfluoromethylvinylether (of formula $CF_2=CFOCF_3$) (MVE, hereinafter).

According to a first preferred embodiment of the invention the perfluoropolymer (B) is a copolymer consisting essentially of recurring units derived from TFE and from HFP.

The perfluoropolymer (B) according to this first preferred embodiment is preferably a tetrafluoroethylene (TFE)/hexafluoropropylene (HFP) copolymer consisting essentially of:

from 7 to 20% wt, preferably from 8 to 18% wt, most preferably from 10 to 15% wt of recurring units derived from HFP; and from 93 to 80% wt, preferably from 92 to 82, most preferably from 90 to 85% wt of recurring units derived from TFE.

According to a second preferred embodiment of the invention the perfluoropolymer (B) is a copolymer consisting essentially of recurring units derived from TFE and from MVE.

The perfluoropolymer (B) according to this second preferred embodiment is preferably a tetrafluoroethylene (TFE)/perfluoromethylvinylether (MVE) copolymer consisting essentially of:

from 7 to 23% wt, preferably from 10 to 23% wt, most preferably from 15 to 23% wt of recurring units derived from MVE; and from 93 to 77% wt, preferably from 90 to 77, most preferably from 85 to 77% wt of recurring units derived from TFE.

The perfluoropolymer (B) according to this second preferred embodiment has advantageously a dynamic viscosity at a shear rate of $1\ s^{-1}$ of at most 100 Pa×sec, preferably of at most 50 Pa×sec, most preferably of at most 30 Pa×sec, at a temperature of 280° C.

Dynamic viscosity is typically measured with a controlled strain rheometer, employing an actuator to apply a deforming strain to the sample and a separate transducer to measure the resultant stress developed within the sample, using the parallel plate fixture.

The amount of melt-processible perfluoropolymer (B) in the multi-phase thermoplastic fluoropolymer composition as above described is of preferably at least 0.3%, more preferably at least 1% by weight of the thermoplastic fluoropolymer (A).

The amount of melt-processible perfluoropolymer (B) in the multi-phase thermoplastic fluoropolymer composition as above described is of preferably at most 5%, more preferably at most 4% by weight of the thermoplastic fluoropolymer (A).

Good results have been obtained with multi-phase thermoplastic fluoropolymer composition comprising from 1 to 3% of melt-processible perfluoropolymer (B) by weight of thermoplastic fluoropolymer (A).

Optionally, the composition described above can further comprise pigments, filling materials, electrically conductive particles, lubricating agents, mold release agents, heat stabilizer, anti-static agents, extenders, reinforcing agents, organic and/or inorganic pigments like $TiO_2$, carbon black, acid scavengers, such as MgO, flame-retardants, smoke-suppressing agents and the like.

By way of non-limiting examples of filling material, mention may be made of mica, alumina, talc, carbon black, glass fibers, carbon fibers, graphite in the form of fibers or of powder, carbonates such as calcium carbonate, macromolecular compounds and the like.

Mold release agents that can be used in the compositions according to the invention are notably perfluorinated polymers, such as PTFE polymers, silicone oil and the like.

Pigments useful in the composition notably include, or will comprise, one or more of the following: titanium dioxide which is available form Whittaker, Clark & Daniels, South Plainfield, New Jersey, USA; Artic blue #3, Topaz blue #9, Olympic blue #190, Kingfisher blue #211, Ensign blue #214, Russet brown #24, Walnut brown #10, Golden brown #19, Chocolate brown #20, Ironstone brown #39, Honey yellow #29, Sherwood green #5, and Jet black #1 available from Shepard Color Company, Cincinnati, Ohio, USA.; black F-2302, blue V-5200, turquoise F-5686, green F-5687, brown F-6109, buff F-6115, chestnut brown V-9186, and yellow V-9404 available from Ferro Corp., Cleveland, Ohio, USA and METEOR® pigments available from Englehard Industries, Edison, N.J., USA.

Another aspect of the present invention concerns a process for manufacturing multi-phase thermoplastic fluoropolymer compositions.

The process of the invention is particularly adapted for the manufacturing of the multi-phase thermoplastic fluoropolymer composition as above defined. Nevertheless, any other process can be sued for manufacturing the compositions of the invention.

The process according to the invention for manufacturing multi-phase thermoplastic fluoropolymer compositions comprises mixing:

(i) a thermoplastic fluoropolymer (A);

(ii) a melt-processible perfluoropolymer (B) under the form of particles having an average primary particle size not exceeding 300 nm;

(iii) and optionally other additives or filling materials.

In the process according to the invention, the polymer (B) is mixed under the form of particles having an average primary particle size of preferably less than 200 nm, even more preferably of less than 150 nm.

For the purpose of the invention the term "particle" is intended to denote a mass of material that, from a geometrical point of view, has a definite three-dimensional volume and shape, characterized by three dimensions, wherein none of said dimensions exceed the remaining two other dimensions of more than 200%. Particles are generally not equidimensional, i.e. that are longer in one direction than in others.

The shape of a particle can be notably expressed in terms of the sphericity $\Phi_s$, which is independent of particle size. The sphericity of a particle is the ratio of the surface-volume ratio of a sphere with equal volume as the particle and the surface-volume ratio of the particle. For a spherical particle of diameter $D_p$, $\Phi_s=1$; for a non-spherical particle, the sphericity is defined as $$\Phi_s = \frac{6 \cdot v_p}{D_p \cdot S_p}$$

wherein:

$D_p$ is the equivalent diameter of particle;

$S_p$ is the surface area of one particle;

$v_p$ is the volume of one particle.

The equivalent diameter is defined as the diameter of a sphere of equal volume. $D_p$ is usually taken to be the nominal size based on screen analysis or microscopic analysis. The surface area is found from adsorption measurements or from the pressure drop in a bed of particles.

The primary particles of polymer (B) of the invention have a sphericity $\Phi_s$ of advantageously at least 0.6, preferably at least 0.65, more preferably at least 0.7. Good results have been obtained with primary particles having a $\Phi_s$ from 0.7 to 0.95.

Primary particles of polymer (B) are generally obtained from emulsion polymerization and can be converted to agglomerates (i.e. collection of primary particles) in the recovery and conditioning steps of polymer (B) manufacture, like notably concentration and/or coagulation of polymer (B) latexes and subsequent drying and homogenization.

The term particles is thus to be intended distinguishable from pellets, which are obtained when extruding polymer (B) in the molten state into strands and chopping the strands into pellets Within the context of this invention, the term primary particle size is intended to denote the smallest size of particles of polymer (B) achieved during polymer (B) manufacture.

Should the polymer (B) not be submitted to conditions wherein agglomeration of primary particles occurs, then the average particles size of polymer (B) is equal to the average primary particles size.

On the contrary, should the polymer (B) submitted to conditions wherein agglomeration of primary particles takes place, then the average particle size of the polymer (B) is different (notably larger) from the average primary particle size.

The average primary particle size of the melt-processible perfluoropolymer (B) can be advantageously measured by the dynamic laser light scattering (DLLS) technique according to the method described in B. Chu "Laser light scattering" Academic Press, New York (1974).

According to a first preferred embodiment of the invention, the process comprises mixing by dry blending and/or melt compounding the polymer (A) and the polymer (B).

Preferably, the process comprises melt compounding polymer (A) and the polymer (B).

Advantageously, the polymer (A) and the polymer (B) are melt compounded in continuous or batch devices. Such devices are well-known to those skilled in the art.

Examples of suitable continuous devices to melt compound the multi-phase thermoplastic fluoropolymer composition of the invention are notably screw extruders. Thus, the polymer (A) and the polymer (B) and optionally other ingredients, are advantageously fed in an extruder and the multi-phase thermoplastic fluoropolymer composition is extruded.

This operating method can be applied either with a view to manufacturing finished product such as, for instance, hollow bodies, pipes, laminates, calendared articles, or with a view to having available granules containing the desired composition, optionally additives and fillers, in suitable proportions in the form of pellets, which facilitates a subsequent conversion into finished articles. With this latter aim, the multi-phase thermoplastic fluoropolymer composition is advantageously extruded into strands and the strands are chopped into pellets.

Optionally, fillers, lubricating agents, heat stabilizer, antistatic agents, extenders, reinforcing agents, organic and/or inorganic pigments like $TiO_2$, carbon black, acid scavengers, such as MgO, flame-retardants, smoke-suppressing agents may be added to the composition during the compounding step.

Preferably, the polymer (A) and the polymer (B) are melt compounded in a twin-screw extruder.

According to a second preferred embodiment of the invention, the process comprises mixing the polymer (A) and the polymer (B) under the form of latexes.

The process according to the second preferred embodiment advantageously comprises the following steps:
  mixing a latex of polymer (A) with a latex of polymer (B), to obtain a latexes mixture;
  coagulating said latexes mixture.

Said latexes mixture can be advantageously coagulated by adding a coagulant. Suitable coagulants are those known in the coagulation of fluoropolymers latexes, for example aluminium sulfate, nitric acid, chloridric acid, calcium chloride. Calcium chloride is preferred. The amount of coagulants depends on the type of the used coagulant. Amounts in the range from 0.001% to 30% by weight with respect to the total amount of water in the latexes mixture, preferably in the range from 0.01% to 5% by weight, can be used.

Advantageously the process according to the second preferred embodiment of the invention further comprises a separation step for the recovery of the thermoplastic multi-phase composition of the invention, and/or a drying step.

According to a third preferred embodiment of the invention, the process comprises mixing by synthesizing polymer (A) in the presence of polymer (B).

The process according to the third preferred embodiment advantageously comprises the following steps:
  introducing in the reaction medium the particles of polymer (B);
  preparing in said reaction medium the polymer (A).

The particles of polymer (B) may be introduced in the reaction medium under the form of dry particles, latex or dispersion.

Preferably the particles of polymer (B) are added under the form of latex.

Should the particles of polymer (B) be introduced under the form of latex, said latex can be advantageously coagulated by adding a coagulant in the reaction medium. The coagulants for the polymer (B) are those known in the coagulation of fluoropolymers latexes, for example aluminium sulfate, nitric acid, chloridric acid, calcium chloride. Calcium chloride is preferred. The amount of coagulants depends on the type of the used coagulant. Amounts in the range from 0.001% to 30% by weight with respect to the total amount of water in the reaction medium, preferably in the range from 0.01% to 5% by weight, can be used. The introduction of the polymer (B) at the beginning and/or during the polymer (A) synthesis is preferred.

The latex of polymer (B) can be obtained by emulsion polymerization (with the involvement of a water soluble initiator) or microsuspension polymerization (with the involvement of an oil soluble initiator). Processes comprising a microemulsion polymerization step as described in U.S. Pat. No. 6,297,334 are suitable for preparing primary particles having a mean diameter of below 100 nm.

During emulsion and/or microemulsion polymerization for obtaining polymer (B), a mild stirring is advantageously applied to prevent the coagulation of the fluoropolymer primary particles.

The polymer (B) polymerization step takes place advantageously in the presence of an emulsifier, preferably in a sufficiently high amount to stabilize the emulsion of the fluoropolymer primary particles.

The emulsifier is preferably a fluorosurfactant. The fluorinated surfactants of formula:

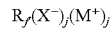

are the most commonly used, wherein $R_f$ is a (per)fluoroalkyl chain $C_5$-$C_{16}$ or a (per)fluoropolyoxyalkylene chain, $X^-$ is $—COO^-$ or $—SO_3^-$, $M^+$ is selected from $H^+$, $NH_4^+$, an alkaline metal ion and j can be 1 or 2. As non limitative example of fluorinated surfactants mention may be made of ammonium and/or sodium perfluorooctanoate, (per)fluoropolyoxyalkylenes having one or more carboxylic end groups.

More preferably, the fluorosurfactant is chosen from:
  $CF_3(CF_2)_{n1}COOM'$, in which $n_1$ is an integer ranging from 4 to 10, preferably from 5 to 7, and more preferably being equal to 6; M' represents H, $NH_4$, Na, Li or K, preferably $NH_4$;
  $T(C_3F_6O)_{n0}(CFXO)_{m0}CF_2COOM''$, in which T represents Cl or a perfluoroalkoxide group $C_kF_{2k+1}O$ with k=integer from 1 to 3, one F atom being optionally substituted by a Cl atom; no is an integer ranging from 1 to 6; $m_0$ is an integer ranging from 0 to 6; M'' represents H, $NH_4$, Na, Li or K; X represents F or $CF_3$;

F—(CF$_2$—CF$_2$)$_{n2}$—CH$_2$ CH$_2$—SO$_3$M''', in which M''' represents H, NH$_4$, Na, Li or K, preferably H; n$_2$ is an integer ranging from 2 to 5, preferably n$_2$=3;

A-R$_f$—B bifunctional fluorinated surfactants, in which A and B, equal to or different from each other, are —(O)$_p$ CFX—COOM*; M* represents H, NH$_4$, Na, Li or K, preferably M* represents NH$_4$; X=F or CF$_3$; p is an integer equal to 0 or 1; R$_f$ is a linear or branched perfluoroalkyl chain, or a (per)fluoropolyether chain such that the number average molecular weight of A-R$_f$—B is in the range 300-1,800.

A co-stabilizer is advantageously used in combination with the emulsifier. Paraffins with a softening point in the range 48° C.-62° C. are preferred as co-stabilizers.

The latex of polymer (B) is advantageously obtained by any process comprising an emulsion polymerization step.

A detailed description of processes comprising an emulsion polymerization step of fluorinated monomers is available notably in U.S. Pat. No. 4,016,345, U.S. Pat. No. 4,725,644 and U.S. Pat. No. 6,479,591.

The water-soluble initiator is advantageously chosen from persulphates, permanganates and hydrosoluble organic peroxides, such as disuccinic acid peroxide.

The water-soluble initiator can be optionally used in combination with a reducing agent. An example thereof is (NH$_4$)$_2$Fe(SO$_4$)$_2$.6H$_2$O (Mohr's salt).

The latex of the polymer (B) can be used directly as obtained from the emulsion polymerization for the preparation of the composition according to the invention. In this case, the latex has a solid content usually ranging from 20 to 30% wt.

Optionally, subsequent to the polymerization step, the latex of polymer (B) can be concentrated to increase the polymer (B) content up to at most 65% wt. The concentrated latex can be notably obtained with anyone of the processes known in the art. As an example, the concentrated latex can be notably obtained by the addition of a nonionic surfactant and by heating above the cloud point of the above-mentioned nonionic surfactant and separating the supernatant water phase from the polymer-rich phase. Otherwise, the concentrated latex can be obtained by an ultrafiltration method, well-known to those skilled in the art.

Optionally, the latex of polymer (B), either as obtained from the polymerization step, or after a concentrating step as described above, can be further purified from the residues of anionic fluorinated surfactants used for the emulsion polymerization. In this case, a latex of polymer (B) substantially free of anionic fluorinated surfactants is advantageously obtained.

The step of preparing the thermoplastic fluoropolymer (A) is advantageously carried out according to known techniques, by copolymerization of the corresponding monomers, in suspension in organic medium or in aqueous emulsion, in the present of a suitable radical initiator, at a temperature comprised between −60° and 150° C., preferably between −20° C. and 100° C., more preferably between 0° and 80° C. The reaction pressure is comprised between 0.5 and 180 bar, preferably between 5 and 140 bar.

Shall the thermoplastic fluoropolymer be a copolymer, the addition of the comonomer(s) is carried out according to known techniques of the art; however a continuous or step by step addition of the comonomer(s) during the reaction is preferred.

Among the various radical initiators, it can be used in particular:

(i) bis-acylperoxides of formula (R$_f$—CO—O)$_2$, wherein R$_f$ is a (per)haloalkyl C$_1$-C$_{10}$ (see for instance EP 185 242 and U.S. Pat. No. 4,513,129), or a perfluoropolyoxyalkylene group (see for instance EP 186 215 and U.S. Pat. No. 5,021,516); among them, bis-trichloroacetylperoxide and bis-dichlorofluoro acetylperoxide are particularly preferred (see U.S. Pat. No. 5,569,728);

(ii) dialkylperoxides of formula (RH—O)$_2$, wherein RH is an alkyl C$_1$-C$_{10}$; diterbutylperoxide (DTBP) is particularly preferred;

(iii) water soluble inorganic peroxides, such as ammonium or alkaline metals persulphates or perphosphates; sodium and potassium persulphate is particularly preferred;

(iv) dialkylperoxydicarbonates, wherein the alkyl has from 1 to 8 carbon atoms, such as di-n-propyl-peroxydicarbonate and di-isopropyl-peroxydicarbonate (see EP 526,216);

(v) alkyl peroxyesters, like tert-amylperoxypivalate and tert-butylperoxyisobutirate;

(vi) organic or inorganic redox systems, such as ammonium persulphate/sodium sulphite, hydrogen peroxide/aminoiminomethansulphinic acid, terbutylhydroperoxide/metabisulphite (see U.S. Pat. No. 5,453,477).

In the case of the suspension copolymerization, the reaction medium is notably formed by an organic phase, to which water is usually added in order to favor the heat dispersion developing during the reaction. The organic phase can be formed by the monomer(s) themselves, without addition of solvents, or by the monomer(s) dissolved in a suitable organic solvent. As organic solvents chlorofluorocarbons are commonly used, such as CCl$_2$F$_2$ (CFC-12), CCl$_3$F (CFC-1), CCl$_2$F—CClF$_2$, (CFC-113), CClF$_2$—CClF$_2$ (CFC-114), and the like.

Since such products have a destroying effect on the ozone present in the stratosphere, alternative products have been recently proposed, such as the compounds containing only carbon, fluorine, hydrogen and optionally oxygen, described in U.S. Pat. No. 5,182,342. In particular (per)fluoropolyethers with at least one hydrogenated end group, preferably two, such as —CF$_2$H, —CF$_2$—CF$_2$H, —CF(CF$_3$)H, can be used. A valid alternative is given by the hydrocarbons with branched chain described in U.S. Pat. No. 5,434,229, having from 6 to 25 carbon atoms and a ratio between methyl groups and carbon atom number higher than 0.5, such as for instance 2,3-dimethylbutane, 2,3-dimethylpentane, 2,2,4-trimethylpentane, 2,2,-4,6,6-pentamethylheptane, 2,2,4,4,6-pentamethylheptane, etc, or mixtures thereof.

In the case of aqueous emulsion (co)polymerization, processes as described above for emulsion and microemulsion polymerization of polymer (B) are also advantageously applied for the preparation of polymer (A).

The control of molecular weight of the thermoplastic fluoropolymer (A) generally needs the use of telogen agents (chain transfer agents) in polymerization, owing to the fact that the used monomers generally do not show a telogen activity comparable to that of the known chain transfer agents.

When chain transfer agents are used, these can be for example hydrocarbons, alcohols, dialkylcarbonates, ketones, ethers, particularly methyl-tert-butylether, or halogenated hydrocarbons, having from 1 to 6 carbon atoms. Among them, chloroform, ethers, dialkylcarbonates and substituted alkyl cyclopentanes, such as methylcyclopentane are particularly preferred (see U.S. Pat. No. 5,510,435). The transfer agent is introduced into the reactor at the beginning of the reaction, or continuously or step by step during the polymerization. The amount of chain transfer agent can range within rather wide limits, depending on the polymerization conditions (reaction temperature, monomers, molecular weight required of the polymer, etc). In general such amount ranges from 0.01 to 30% by weight, preferably from 0.05 to 10% by weight, based on the total amount of monomers introduced in the reactor.

The multi-phase thermoplastic fluoropolymer composition of the invention can be processed following standard methods for injection molding, extrusion, thermoforming, machining, and blow molding and the like.

The multi-phase thermoplastic fluoropolymer compositions as above described are particularly suitable for all processing technologies wherein said composition is processed in the melt state.

In particular, when using the multi-phase thermoplastic composition of the invention it is possible to process in ordinary conditions thermoplastic fluoropolymer components [i.e. polymer (A), as above described] having increase molecular weight, so that articles having improved mechanical properties (such as impact resistance, hoop stress, resilience . . . ) can be obtained.

Still an object of the invention is an article comprising the multi-phase thermoplastic fluoropolymer composition as above described, or obtainable by the process as above described.

Advantageously the article is an injection molded article, an extrusion molded article, a machined article, a coated article or a casted article.

Non-limitative examples of articles are shaped article, pipes, fittings, housings, films, membranes, coatings.

Articles of the invention can advantageously find application in the in the oil and gas industry. Articles for oil field applications include shock tubing, encapsulated injection tubing, coated rod, coated control cables, down-hole cables, flexible flow lines and risers.

Articles of the invention are particularly suitable for the CPI market, that is to say for the so-called chemical process industry, wherein, typically:
- corrosion-resistant linings comprising the composition of the invention can be applied by powder coating, sheet lining, extruded lining, rotational lining or other standard technique;
- membranes comprising the composition of the invention can be made with varying degrees of porosity and manufacturing methods for use in water purification, foodstuffs dehydration, filtration of chemicals, and the like;
- pipes, valves, pumps and fittings comprising the composition as above described can be used in chemical process equipment when excellent temperature and chemical resistance are required. Small pieces can economically be made entirely of the composition of the invention. Extruded or molded components include tubes, pipes, hose, column packing, pumps, valves, fittings, gaskets, and expansion joints.

Also, articles of the invention are advantageously suitable for building and architecture applications; in this domain, typically:
- flexible corrugated ducts comprising the composition of the invention advantageously prevent corrosion from SO2 and other products of combustion in residential chimney flues;
- pipes and fittings comprising the composition of the invention advantageously provide for long life hot water service.

Moreover, articles of the invention can advantageously find application in the semiconductors industry, where the composition of the invention can, for instance, act as strong, tough, high purity material used routinely as structural materials in wet bench and wafer processing equipment. Moreover, the composition of the invention is suitable for construction of fire-safe wet benches and for windows, access panels, mini-environments, site glasses, and any other area within the cleanroom where transparency is needed.

The addition of a melt-processible perfluoropolymer (B) as discrete domains of small dimension advantageously enables improvement of rheological behavior of thermoplastic fluoropolymer (A), making possible processing in less severe conditions and yielding final parts with outstanding surface aspect and good homogeneity and coherency.

The process according to the invention is advantageously particularly efficient in assuring optimal distribution of the polymer (B) in the thermoplastic composition, which enables increased efficiency of polymer (B) as processing aid and avoids negative impact on mechanical properties. The melt-processible character of the polymer (B) associated with the small size of the primary particles of the same enables optimal distribution within the overall thermoplastic fluoropolymer matrix and discrete domains of small size to be formed, thus maximizing efficiency of the processing aid with no negative impact on the mechanical properties.

Some examples of the present invention are reported hereinafter, whose purpose is merely illustrative but not limitative of the scope of the invention itself.

EXAMPLES

Analytical Methods

SEM Microscopy

SEM microscopy pictures have been taken using the electronic scanning microscope (SEM) model Stereoscan 200 by Cambridge Instruments at different magnification levels (from 32 to 10 000×) either on sample fractured at liquid nitrogen temperature, or on final shaped articles.

Dynamic Viscosity

Dynamic viscosity of the polymer is measured at a shear rate of 1 s$^{-1}$ and at a temperature exceeding of roughly 30° C. the melting point of said polymer with a Rheometric Scientific ARES controlled strain rheometer, employing an actuator to apply a deforming strain to the sample and a separate transducer to measure the resultant stress developed within the sample, and using the parallel plate fixture.

TFE/HFP Polymer Composition

The HFP content for the TFE/HFP copolymers is determined by measuring the IR absorbance at 982 cm$^{-1}$ ($A_{982cm^{-1}}$) and at 2367 cm$^{-1}$ ($A_{2367cm^{-1}}$) on a 50 μm-thick compression molded film. HFP content is calculated according to the following formula:

$$HFP_{(\% wt)} = \frac{A_{982\ cm^{-1}}}{A_{2367\ cm^{-1}}} \times 3.2$$

$$HFP_{(\% moles)} = \frac{(100 \times HFP_{(\% wt)})}{(150 - 0.5 \times HFP_{(\% wt)})} \times 3.2$$

Polymer Latex Particle Size

The average particle size of the polymer latex has been measured by the dynamic laser light scattering (DLLS) technique according to the method described in B. Chu "Laser light scattering" Academic Press, New York (1974), using a Brookhaven Scientific Instrument, composed by the BI9000 correlator and by the BI200SM goniometer. The used light source is an argon ion laser Spectra Physics (wave length 514.5 nm).

Differential Scanning Calorimetry

DSC measurements have been performed at a heating rate of 10° C./min, according to ASTM D 3418.

Domains

Maximal dimension of the phase-separated domains have been determined by SEM microscopy and image recognition on samples of the composition, obtained from microtomic cuts or fractures, realized at liquid nitrogen temperature.

Example 1

Preparation of a Melt-Processable Perfluoropolymer

A 5 l AISI 316 autoclave equipped with a stirrer working at 650 rpm was evacuated and there were introduced 3 l of demineralized water and 22.5 g of a microemulsion formed of:

20% by weight of GALDEN® D02, having the formula:

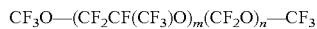

$CF_3O-(CF_2CF(CF_3)O)_m(CF_2O)_n-CF_3$ where m/n=20 and average molecular weight of 450;

40% by weight of a surfactant having the formula:

$Cl-(C_3F_6O)-(CF_2CF(CF_3)O)_{m1}-(CF(CF_3)O)_q-(CF_2O)_{n1}-CF_2COO^-K^+$ where n1=0.8% ml, q=9.2% ml and average molecular weight of 540;

the remaining part being formed by $H_2O$.

The autoclave was heated to the reaction temperature of 85° C. and HFP was then introduced to bring the total pressure in the vessel to 13.50 absolute bar. Then ethane was charged as chain transfer agent until the total pressure reached 13.60 absolute bar, and afterwards a TFE/HFP mixture containing 10% by moles of HFP was fed to obtain the reaction pressure of 21 absolute bar.

The polymerization was initiated by introducing 150 ml of a potassium persulfate (KPS) solution, obtained by dissolving 30 g KPS in 1 liter of demineralized water.

The reaction pressure was kept constant by feeding the monomer mixture TFE/HFP containing 10% by moles of HFP. At 60 and 120 minutes from the reaction start, 75 ml of KPS solution were fed. After 161 minutes of reaction, the polymerization was stopped, cooling the reactor to room temperature and releasing the residual pressure.

A latex containing 202 (g polymer)/(kg latex) was discharged (average primary particles size=125 nm) and coagulated with $HNO_3$, then the polymer was separated, washed with demineralized water and dried in an oven at 175° C. for about 16 hours.

The obtained powder has a dynamic viscosity of 210 Pa×s at 250° C. and at a shear rate of 1 $s^{-1}$, a $T_{m2}$ of 220° C., a $\Delta H_{2f}$=18.9 J/g and is composed of 12% by moles of HFP and 88% by moles of TFE.

Example 2

Melt Compounding and Pipe Extrusion of a Composition of a Thermoplastic Fluoropolymer and a Melt-Processible Perfluoropolymer A blend comprising a mixture of SOLEF® 6015 and SOLEF® 31515 VdF polymers (67/33 wt/wt) and 1% by weight of the TFE/HFP copolymer of example 1 were dry mixed for 5 hours in a rotary blender and melt compounded in a Braebender conical twin-screw Hastelloy C-276 extruder having a final diameter of 18 mm. Temperature profile and extrusion parameters are detailed in Table 1.

TABLE 1

| | | |
|---|---|---|
| Zone 1 temperature (barrel) | (° C.) | 200 |
| Zone 2 temperature (barrel) | (° C.) | 210 |
| Zone 3 temperature (barrel) | (° C.) | 220 |
| Zone 4 temperature (head) | (° C.) | 230 |
| Torque | (Nm) | 42-45 |
| Pressure | (bar) | 74-80 |
| Melt temperature | (° C.) | 230 |
| Throughput rate | (kg/h) | 3 |
| Screw speed | (rpm) | 15 |

The thus obtained composition has a MFI (230° C./10 kg) of 0.6 g/10 min.

The composition was then extruded to make tubes with an external diameter of 25 mm and a thickness of about 2-3 mm. They were extruded in a single screw extruder with a diameter of 45 mm. The diameter of the die was 53.7 mm and the diameter of the tip was 43.6 mm. The temperature profile and extrusion parameters are reported in the following table 2.

TABLE 2

| | | |
|---|---|---|
| Zone 1 temperature (barrel) | (° C.) | 190 |
| Zone 2 temperature (barrel) | (° C.) | 210 |
| Zone 3 temperature (barrel) | (° C.) | 210 |
| Zone 4 temperature (barrel) | (° C.) | 210 |
| Zone 5 temperature (neck) | (° C.) | 215 |
| Zone 6 temperature (neck) | (° C.) | 210 |
| Zone 7 temperature (body) | (° C.) | 215 |
| Zone 8 temperature (die holder) | (° C.) | 210 |
| Zone 8 temperature (die) | (° C.) | 220 |
| Head pressure | (bar) | 36 |
| Melt temperature | (° C.) | 257 |
| Screw speed | (rpm) | 15 |
| Extruder consumption | (A) | 32 |
| Extruder Voltage | (V) | 51 |

The extruded pipe had a smooth surface, with no visible crack and/or surface defects.

FIG. 1 shows a SEM picture (magnification: 10 000×) of the thermoplastic composition of example 2 on a specimen sampled from the extruded pipe, after fragile rupture at liquid nitrogen temperature: white spots are discrete domains of TFE/HFP copolymer of example 1, whose maximal dimension does not exceed 1 μm.

Mechanical properties have been evaluated on specimens using from extruded pipes and measured according to ASTM D 638.

Results are detailed in Table 3.

TABLE 3

| Thermoplastic fluoropolymer (A) | Melt-processible perfluoropolymer (B) nature | Amount | Elastic modulus (MPa) | Stress at yield (MPa) | Strain at yield (%) | Stress at break (MPa) | Strain at break (%) |
|---|---|---|---|---|---|---|---|
| SOLEF ® 6015 PVDF + SOLEF ® 31515 PVDF (33/67 wt/wt) | TFE/HFP copolymer from example 1 | 1% by weight of (A) | 1168 | 33.2 | 11.4 | 51.7 | 377 |

Comparative Example 3

Melt Compounding and Pipe Extrusion of a Composition of a Thermoplastic Fluoropolymer A blend of SOLEF® 6015 and SOLEF® 31515 VdF polymers (67/33 wt/wt) has been dry mixed for 5 hours in a rotary blender and melt compounded in a Braebender conical twin-screw extruder as described in example 2.

The thus obtained blend has a MFI (230° C./10 kg) of 0.5 g/10 min.

The blend was then extruded to make tubes with an external diameter of 25 mm and a thickness of about 2-3 mm, as described in example 2. Details of pipe extrusion parameters, at two different screw speeds, are detailed in Table 4.

TABLE 4

| Zone 1 temperature (barrel) | (° C.) | 190 | 190 |
|---|---|---|---|
| Zone 2 temperature (barrel) | (° C.) | 210 | 210 |
| Zone 3 temperature (barrel) | (° C.) | 210 | 210 |
| Zone 4 temperature (barrel) | (° C.) | 210 | 210 |
| Zone 5 temperature (neck) | (° C.) | 215 | 215 |
| Zone 6 temperature (neck) | (° C.) | 210 | 210 |
| Zone 7 temperature (body) | (° C.) | 215 | 215 |
| Zone 8 temperature (die holder) | (° C.) | 210 | 210 |
| Zone 8 temperature (die) | (° C.) | 220 | 220 |
| Head pressure | (bar) | 33 | 41 |
| Melt temperature | (° C.) | 254 | 256 |
| Screw speed | (rpm) | 15 | 25 |
| Extruder consumption | (A) | 34 | 38 |
| Extruder Voltage | (V) | 51 | 79 |

The pipes extruded in either condition had surface defects, like visible crack on their surface. Evaluation of mechanical properties on such extruded material was thus impossible.

Comparative Example 4

Melt Compounding and Pipe Extrusion of a Composition of a Thermoplastic Fluoropolymer and a Melt-Processible Perfluoropolymer Procedure as detailed in example 2 was repeated but using a HFP/TFE copolymer powder; more than 60% by weight of which has a particles size exceeding 600 μm, when measured by sieve analysis according to ASTM D 1921.

Figure 2:
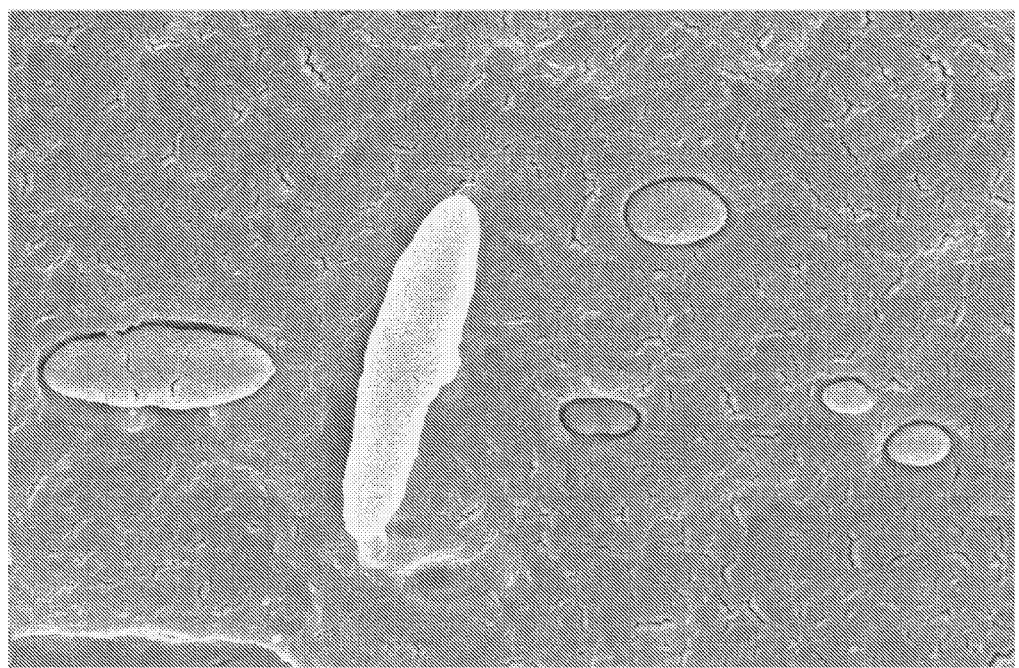
FIG. 2 is a SEM picture (magnification: 10 000×) of a specimen sampled from an extruded pipe of the thermoplastic composition of comparative example 4, after fragile rupture at liquid nitrogen temperature.

The so-obtained blend was then extruded to make tubes as described in example 2. The pipes so extruded had surface defects. FIG. 2 shows a SEM picture (magnification: 10 000×) of the thermoplastic composition of comparative example 4 on a specimen sampled from the extruded pipe, after fragile rupture at liquid nitrogen temperature. Defined spots due to the discrete domains of TFE/HFP copolymer are clearly distinguishable, whose dimension generally exceeds 1 μm.

Example 5

Preparation of a Melt-Processible Perfluoropolymer

A 5 l AISI 316 autoclave equipped with a stirrer working at 650 rpm was evacuated and there were introduced 3 l of demineralized water and 30 g of a microemulsion formed of:

18.3% by weight of Galden® D02, having the formula:

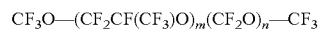
$$CF_3O-(CF_2CF(CF_3)O)_m(CF_2O)_n-CF_3$$

where m/n=20 and average molecular weight of 450;

30.6% by weight of a surfactant having the formula:

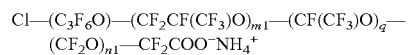
$$Cl-(C_3F_6O)-(CF_2CF(CF_3)O)_{m1}-(CF(CF_3)O)_q-(CF_2O)_{n1}-CF_2COO^-NH_4^+$$

where n1=0.8% ml, q=9.2% ml and average molecular weight of 540;

the remaining part being formed by $H_2O$.

The autoclave was heated to the reaction temperature of 85° C. and HFP was then introduced to bring the total pressure in the vessel to 13.37 absolute bar. Then ethane was charged as chain transfer agent until the total pressure reached 14.37 absolute bar, and afterwards a TFE/HFP mixture containing 10% by moles of HFP was fed to obtain the reaction pressure of 21 absolute bar.

The polymerization was initiated by introducing 50 ml of a potassium persulfate (KPS) solution, obtained by dissolving 30 g KPS in 1 liter of demineralized water.

The reaction pressure was kept constant by feeding the monomer mixture TFE/HFP containing 10% by moles of HFP. At 30, 70 and 120 minutes from the reaction start, 50 ml of KPS solution were fed. After 260 minutes of reaction, the polymerization was stopped, cooling the reactor to room temperature and releasing the residual pressure.

A latex containing 123.7 (g polymer)/(kg latex), with average primary particle size of 43 nm, was discharged and coagulated with $HNO_3$, then the polymer was separated, washed with demineralized water and dried in an oven at 175° C. for about 16 hours.

The obtained powder has a dynamic viscosity of less than 100 Pa×s at 270° C. and at shear rate of 1 $s^{-1}$, a $T_{m2}$ of 240.4°

C., a $\Delta H_{2f}$ of 28.8 J/g and is composed of 10% by moles of HFP and 90% by moles of TFE.

Example 6

Melt Compounding and Pipe Extrusion of a Composition of a Thermoplastic Fluoropolymer and a Melt-Processible Perfluoropolymer A ECTFE copolymer (E/CTFE 50/50% mole) having a MFI (275° C./5 kg) of 0.9 g/10 min and a melting point of 240° C. has been melt compounded with 1% wt of the TFE/HFP copolymer of example 5. The composition was melt compounded and pelletized in a single screw Brabender Hastelloy C-276 extruder having a diameter of 18 mm and a L/D (length on diameter) ratio of 25, equivalent to 25 times the diameter, in the following conditions (Table 5):

TABLE 5

| Barrel Zone 1 | Temperature (° C.) | 235 |
|---|---|---|
| Barrel Zone 2 | Temperature (° C.) | 245 |
| Barrel Zone 3 | Temperature (° C.) | 260 |
| Barrel Zone 4 | Temperature (° C.) | 270 |
| Melt | Temperature (° C.) | 298 |
| RPM | | 70 |

Example 7 and Comparative Example 8

Extrusion Coating of a Thermoplastic Fluoropolymer Composition

Thermoplastic fluoropolymer composition of example 6 has been processed in a Davis wire line for extrusion coating an AWG 20 19-wire-copper. The Davis line is equipped with a single Hastelloy C276 screw extruder having a diameter of 38 mm and a L/D ratio of 30. A tubular die having a draw down ratio (DDR) of 25 was used to obtain a coat thickness of 0.25 mm. Processing conditions for the extrusion coating of both composition of example 6 and an ECTFE copolymer (E/CTFE 50/50% mole) having a MFI (275° C./5 kg) of 0.9 g/10 min and a melting point of 240° C. are detailed in Table 6.

TABLE 6

| material | | Example 7 Composition from example 6 | Comparative example 8 ECTFE copolymer |
|---|---|---|---|
| T barrel 1 | (° C.) | 230 | 230 |
| T barrel2 | (° C.) | 255 | 250 |
| T barrel 3 | (° C.) | 265 | 260 |
| T barrel 4 | (° C.) | 275 | 270 |
| T barrel 5 | (° C.) | 285 | 280 |
| T clamp | (° C.) | 285 | 280 |
| T body | (° C.) | 285 | 280 |
| T die holder | (° C.) | 295 | 290 |
| T die | (° C.) | 315 | 310 |
| T melt | (° C.) | 312 | 296 |
| vacuum | bar | 0.993 | 0.993 |
| Air gap | cm | 10 | |
| Wire preheating | (V)/(° C.) | 6/120 | 6/120 |
| Power consumption | Amp | 15 | 13.2 |
| Extruder voltage | Volt | 70 | 35 |
| Screw pressure | bar | 147 | 169 |
| Head pressure | bar | 142 | 153 |
| Screw speed | rpm | 25 | 11.2 |
| Line speed | m/min | 37 | 37 |

TABLE 6-continued

| material | | Example 7 Composition from example 6 | Comparative example 8 ECTFE copolymer |
|---|---|---|---|
| Coated wire | | Excellent visual aspect | Poor visual aspect, with visual defects |

Figure 3:
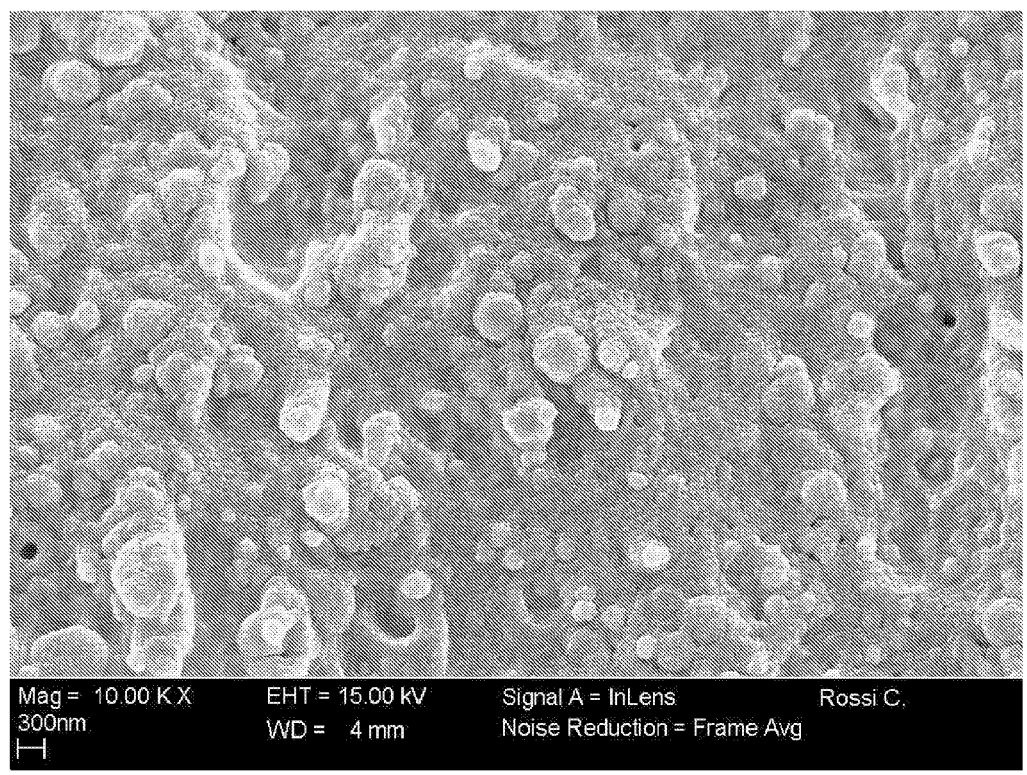
FIG. 3 is a SEM picture (magnification: 10 000×) of a specimen of thermoplastic composition of example 6 sampled from the section of the wire insulation layer, after fragile rupture at liquid nitrogen temperature

FIG. 3 shows a SEM picture (magnification: 10 000×) of a specimen of thermoplastic composition of example 6 sampled from the section of the wire insulation layer, after fragile rupture at liquid nitrogen temperature: white spots are discrete domains of TFE/HFP copolymer of example 4, whose maximal dimension does not exceed 1 μm.

Surface aspects of coated wire of example 7 and comparative example 8 have been analysed via SEM technique.

Figure 4:
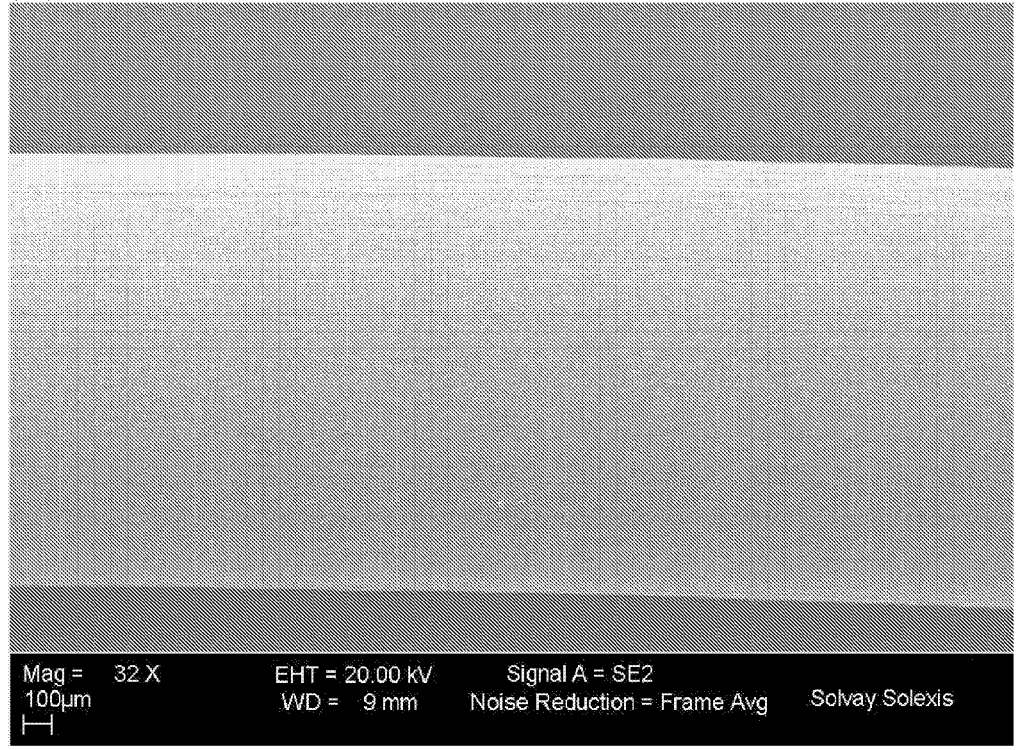
FIG. 4 is a SEM picture of the wire coated by extrusion coating from example 7 at a magnification of respectively 32×(4a) and 1 000×(4b).
Figure 4:
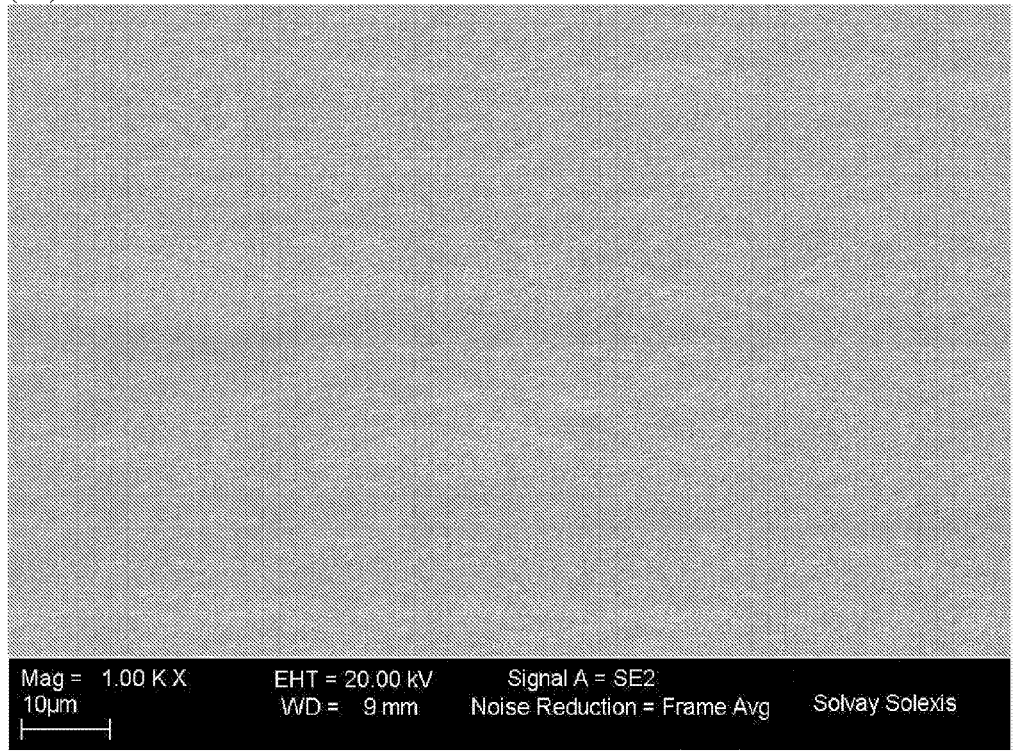

Pictures of FIG. 4 depict the surface of the coated wire from example 7 according to the invention, at a magnification of respectively 32×(4a) and 1000×(4b): it can be observed that the surface is particularly smooth with no visual defect.

Figure 5:
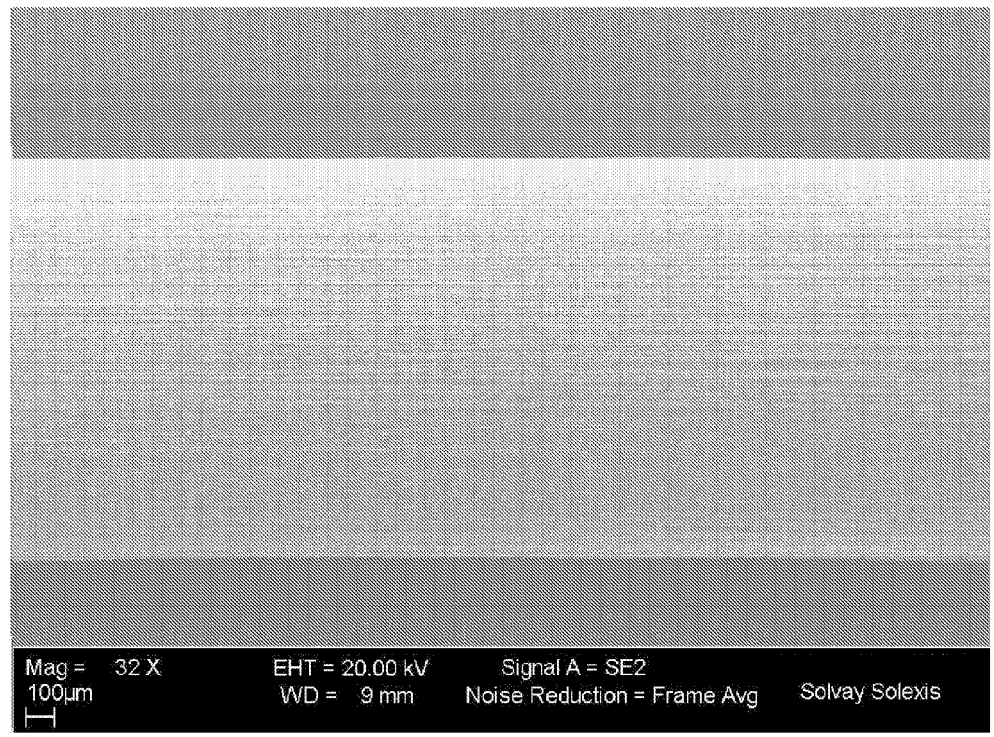
FIG. 5 is a SEM picture of the wire coated by extrusion coating with an ECTFE polymer (comparative example 8) at a magnification of respectively 32×(5a) and 1000×(5b).
Figure 5:
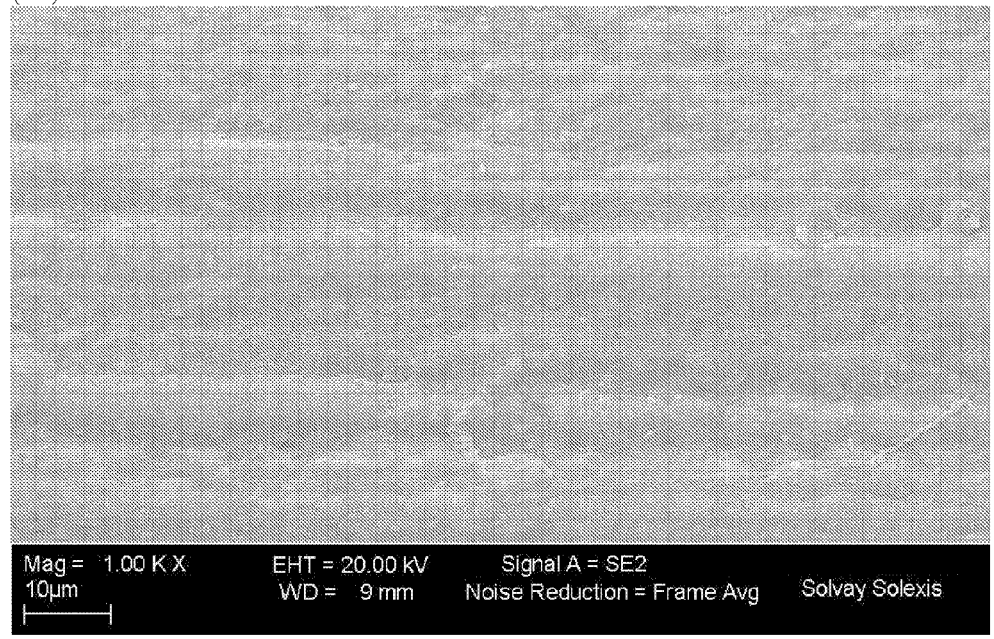

Pictures of FIG. 5 depict the surface of the coated wire from comparative example 8, at a magnification of respectively 32×(5a) and 1000×(5b): it can be observed that the surface is rough with visual defect.

Example 9

Preparation by Polymerization of a Composition of a Thermoplastic Fluoropolymer In an enamelled autoclave equipped with enamelled baffles and stirrer working at 450 rpm, 6.1 l of demineralized water, 1.7 l of methanol, 280 g of a TFE/HFP copolymer latex (containing 123.7 (g polymer)/(kg latex)), obtained according to Example 5, 4.75 g of chloroform, and 2.5 kg of chlorotrifluoroethylene (CTFE) were introduced. Then the latex was coagulated under stirring by feeding 175 ml of an aqueous $CaCl_2$ solution at 10% by weight. The reaction temperature was set and maintained at 5° C. Then ethylene was fed up to a pressure of 11.35 absolute bar.

In the autoclave the radical initiator was then continuously fed during the whole ECTFE (co)polymer synthesis under the form of a solution, maintained at −17° C., of trichloroacetylperoxide (TCAP) in isooctane with a concentration of 0.13 g TCAP/ml.

The pressure was kept constant for the whole polymerization by continuously feeding ethylene into the reactor up to a consumption of 200 g; the total amount of initiator solution was 39 ml. The polymerization lasted 322 minutes.

The product was discharged, separated from water by a centrifuge and dried at 120° C. for about 16 hours. The amount of dry product obtained was 1620 g.

The obtained powder was found to have a MFI (275° C./10 kg) of 0.32 g/10 min.

In the residue of the dried polymerization water phase no TFE/HFP copolymer was detected by IR spectroscopy. The product contained 2.2% of TFE/HFP copolymer by weight of ECTFE as determined by mass balance.

Figure 6:
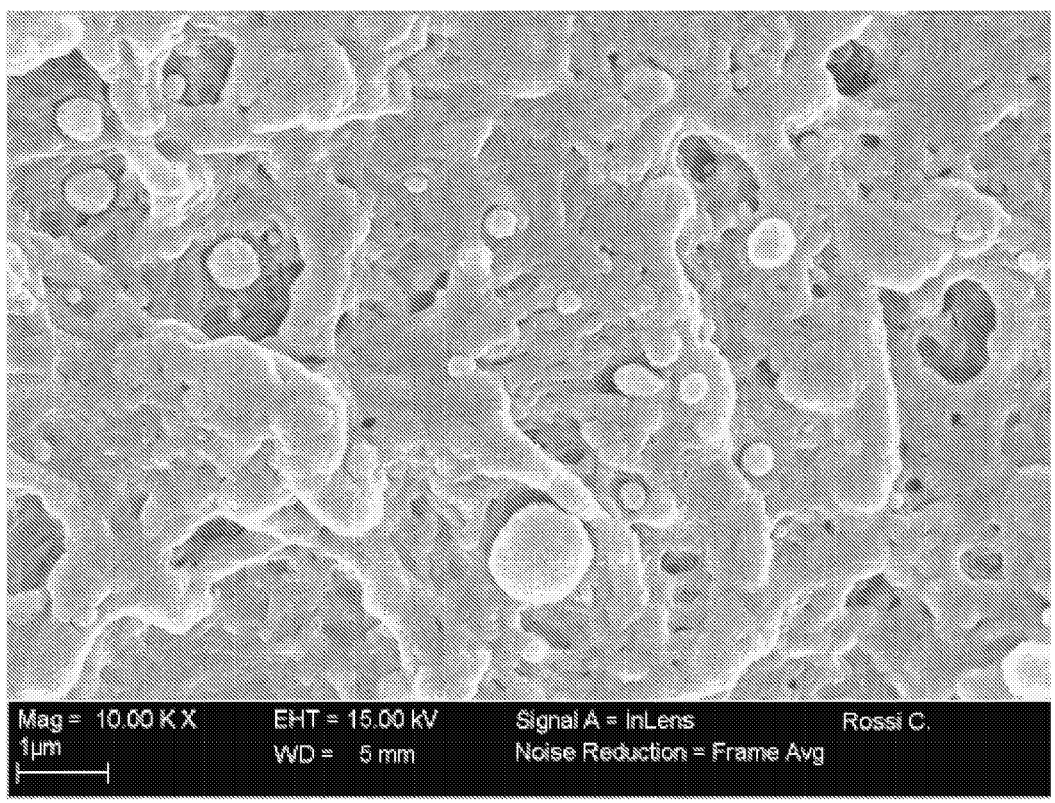
FIG. 6 is a SEM picture (magnification: 10 000×) of a specimen taken from an extruded rod of the composition of example 9 after fragile rupture at liquid nitrogen temperature.

FIG. 6 shows a SEM picture (magnification: 10 000×) of a specimen taken from an extruded rod of the composition of example 9 after fragile rupture at liquid nitrogen temperature: whiter spots are discrete domains of the TFE/HFP copolymer, whose maximal dimension does not exceed 1 μm.

Example 10

Preparation of a Melt-Processable Perfluoropolymer

A 22 l AISI 316 autoclave equipped with a stirrer working at 500 rpm was evacuated and there were introduced 14.5 l of demineralized water and 139.7 g of a microemulsion formed of:

20% by weight of GALDEN® D02, having the formula:

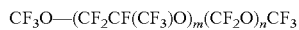

$$CF_3O—(CF_2CF(CF_3)O)_m(CF_2O)_nCF_3$$

where m/n=20 and average molecular weight of 450;

30% by weight of a surfactant having the formula:

$$Cl—(C_3F_6O)—(CF_2CF(CF_3)O)_{m1}—(CF(CF_3)O)_q—(CF_2O)—CF_2COO^-NH_4^+$$

where n1=1.0% m1, q=9.1% ml and average molecular weight of 550;

the remaining part being formed by $H_2O$.

The autoclave was evacuated and then heated to the reaction temperature of 75° C. Then ethane was charged as chain transfer agent with a delta pressure of 2.1 bar, MVE (perfluoromethylvinylether) was charged with a delta pressure of 7.4 bar, and afterwards a TFE/MVE mixture containing 10% by moles of MVE was fed to obtain the reaction pressure of 21 absolute Bar.

The polymerization was initiated by introducing 315 ml of an ammonium persulfate (APS) solution, obtained by dissolving 14.5 g APS in 1 liter of demineralized water.

The reaction pressure was kept constant by continuously feeding the monomer mixture TFE/MVE containing 10% by moles of MVE. After 240 minutes of reaction, the polymerization was stopped, the reactor was cooled to room temperature and the residual pressure was released.

A latex (average primary particle size=97 nm) containing 326 g polymer/kg latex was discharged and coagulated with $HNO_3$; polymer was then separated, washed with demineralized water and dried in an oven at 120° C. for about 16 hours. The obtained polymer under the form of powder was shown to have a dynamic viscosity of less than 20 Pa×s at 280° C. and at a shear rate of 1 s$^{-1}$, a $T_{m2}$ of 237° C., a $\Delta H_{2f}$=14.23 J/g and was composed of 15% by moles (22.7 wt %) of MVE and 85% by moles (77.3 wt %) of TFE.

Example 11

Melt Compounding and T-Fitting Injection Molding of a Composition of a Thermoplastic Fluoropolymer and a Melt-Processable Perfluoropolymer A blend comprising a mixture of SOLEF® 6015 and 1% by weight of the TFE/MVE copolymer of example 10 were dry mixed for 16 hours in a rotary blender and melt compounded in a Braebender conical twin-screw Hastelloy C-276 extruder having a final diameter of 18 mm. Temperature profile and extrusion parameters are detailed in Table 7.

TABLE 7

| | | |
|---|---|---|
| Zone 1 temperature (barrel) | (° C.) | 200 |
| Zone 2 temperature (barrel) | (° C.) | 210 |
| Zone 3 temperature (barrel) | (° C.) | 220 |
| Zone 4 temperature (head) | (° C.) | 230 |
| Torque | (Nm) | 60 |
| Pressure | (bar) | 85 |
| Melt temperature | (° C.) | 230 |
| Throughput rate | (kg/h) | 4.6 |
| Screw speed | (rpm) | 15 |

The composition was then injection molded to prepare fittings having a T-like shape (so-called T-fittings). The composition was injection molded in a Negri Bossi press. The diameter of the screw was 30 mm with a length-to-diameter ratio of 24 and the clamping force was of 100 ton. The temperature profile and molding parameters are reported in the following table 8.

TABLE 8

| | | |
|---|---|---|
| Barrel temperature 1 | (° C.) | 210 |
| Barrel temperature 2 | (° C.) | 210 |
| Barrel temperature 3 | (° C.) | 215 |
| Barrel temperature 4 | (° C.) | 220 |
| Nozzle temperature | (° C.) | 220 |
| Mould temperature | (° C.) | 106 |
| Injection specific pressure | (kg/cm$^2$) | 857 |
| Hold specific pressure | (kg/cm$^2$) | 857 |
| Screw rotating speed | rpm | 50 |
| Injection speed | cm/s | 13.8 |
| Cycle time | s | 96 |

The molded T-fittings had a smooth surface, with no visible crack and/or surface defects.

Figure 7:
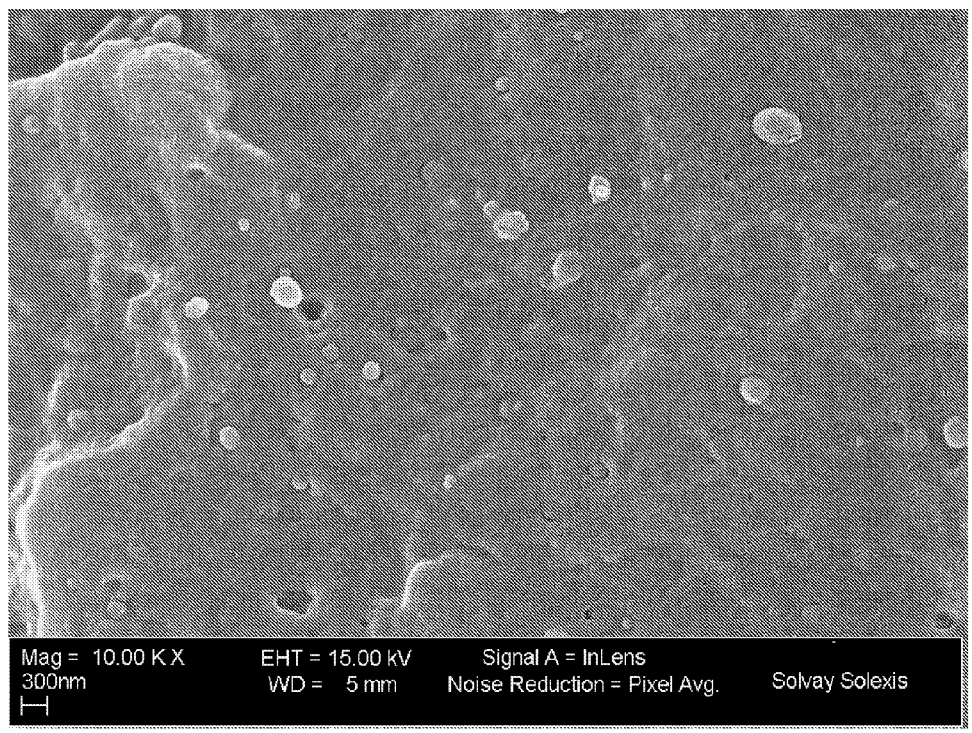
FIG. 7 is a SEM picture (magnification: 10 000×) of a specimen taken from an extrusion-injection molded T-fitting of the composition of example 11 after fragile rupture at liquid nitrogen temperature.

A specimen of the FIG. 7 thermoplastic composition of example 11 was sampled from the T-fitting molded as above described by fragile rupture at liquid nitrogen temperature and then submitted to SEM analysis. FIG. 7 shows the SEM picture (magnification: 10 000×) of said specimen: white spots are discrete domains of TFE/MVE copolymer of example 10, whose maximal dimension does not exceed 1 μm.

The invention claimed is:

1. A multi-phase thermoplastic fluoropolymer composition consisting of:
   at least one thermoplastic fluoropolymer, polymer (A); and
   from 0.1 to 10% by weight of (A) of at least one melt-processable perfluoropolymer, polymer (B),
   wherein the polymer (B) is present in the composition in phase-separated domains in a continuous phase mainly comprising polymer (A), at least 75% by volume of said domains having maximal dimension not exceeding 1 μm, and said polymer (B) is in the form of particles having an average primary particle size not exceeding 300 nm.

2. The composition according to claim 1, wherein the polymer (A) is a hydrogen-containing fluoropolymer.

3. The composition according to claim 2, wherein the polymer (A) is selected from the group consisting of:
   tetrafluoroethylene (TFE) and/or chlorotrifluoroethylene (CTFE) copolymers with ethylene, propylene or isobutylene, with a molar ratio per(halo)fluoromonomer(s)/hydrogenated comonomer(s) of from 30:70 to 70:30, optionally containing one or more comonomers in amounts of from 0.1 to 30% by moles, based on the total amount of TFE and/or CTFE and hydrogenated comonomer(s); and (A-2) Vinylidene fluoride (VdF) polymers, optionally comprising between 0.1 and 15% by moles of one or more fluorinated comonomer(s), and optionally further comprising one or more hydrogenated comonomer(s).

4. The composition according to claim 3, wherein the VdF polymers have a melt index of at most 10 g/10 min, when measured in accordance to ASTM test No. 1238, run at 230° C., under a piston load of 5 kg.

5. The composition according to claim 4, wherein the polymer (A) is a VdF polymer comprising:
(a') at least 60% by moles of vinylidene fluoride (VdF);
(b') optionally from 0.1 to 15% by moles of a fluorinated comonomer selected from the group consisting of vinylfluoride ($VF_1$), chlorotrifluoroethylene (CTFE), hexafluoropropene (HFP), tetrafluoroethylene (TFE), trifluoroethylene (TrFE) and mixtures therefrom; and
(c') optionally from 0.1 to 5%, by moles, based on the total amount of monomers (a') and (b'), of one or more fluorinated or hydrogenated comonomer(s).

6. The composition according to claim 1, wherein the polymer (B) is a TFE copolymer comprising at least 2% wt and at most 20% wt of recurring units derived from at least one fluorinated comonomer selected from the group consisting of:
(i) perfluoroalkylvinylethers complying with formula $CF_2=CFOR_{f1'}$, in which $R_{f1'}$ is a $C_1$-$C_6$ perfluoroalkyl;
(ii) perfluoro-oxyalkylvinylethers complying with formula $CF_2=CFOX_0$, in which $X_0$ is a $C_1$-$C_{12}$ perfluorooxyalkyl having one or more ether groups ; and
(iii) $C_3$-$C_8$ perfluoroolefins.

7. The composition according to claim 6, wherein the polymer (B) is a TFE copolymer wherein the fluorinated comonomer is hexafluoropropylene and/or perfluoromethylvinylether.

8. The multi-phase thermoplastic fluoropolymer composition according to claim 6, wherein the polymer (B) comprises units of at least one perfluoroalkylvinylether complying with formula $CF_2=CFOR_{f1'}$, in which $R_{f1}$ is $CF_3$, $C_2F_5$ or $C_3F_7$.

9. The multi-phase thermoplastic fluoropolymer composition according to claim 6, wherein the polymer (B) comprises units of perfluoro-2-propoxy-propyl.

10. The multi-phase thermoplastic fluoropolymer composition according to claim 6, wherein the polymer (B) comprises units of hexafluoropropylene.

11. A process for manufacturing the multi-phase thermoplastic fluoropolymer composition of claim 1, comprising mixing:
(i) the thermoplastic fluoropolymer (A);
(ii) from 0.1 to 10% by weight of (A) of a melt-processible perfluoropolymer (B) under the form of particles having an average primary particle size not exceeding 300 nm.

12. The process according to claim 11, wherein it comprises mixing by dry blending and/or melt compounding the polymer (A) and the polymer (B).

13. The process according to claim 11, wherein it comprises mixing the polymer (A) and the polymer (B) under the form of latexes.

14. The process according to claim 11, comprising mixing the perfluoropolymer (B) with a reaction medium and synthesizing the polymer (A) in the reaction medium.

15. An article comprising the multi-phase thermoplastic fluoropolymer composition according to claim 1.

16. The multi phase thermoplastic fluoropolymer composition according to claim 1, comprising from 1 to 3% by weight of (A) of at least one melt-processible perfluoropolymer, polymer (B).

17. The multi-phase thermoplastic fluorpolymer composition according to claim 1, wherein said polymer B in the form of particles having an average primary size less than 200 nm.

18. The multi-phase thermoplastic fluoropolymer composition according to claim 1, wherein said polymer B in the form of particles having an average primary size less than 150 nm.

19. A multi-phase thermoplastic fluoroplymer composition comprising:
at least one thremoplastic fluoropolymer, polymer (A); and
from 0.1 to 10% by weight of (A) of at least one melt processible perfluoropolymer, polymer (B),
wherein polymer (B) is present in the composition in phase-separated domains in a cotinuous phase mainly comprising polymer (A), at least 75% by volume of said domains having maximal dimension not exceeding 1 µm and wherein polymer (B) is a tetrafluoroethylene (TFE)/perfluoromethylvinylether (MVE) copolymer consisting essentially of:
from 7 to 23% wt of recurring units derived from MVE; and
from 93 to 77% wt of recurring units derived from TFE.

20. The composition of claim 19, wherein the TFE/MVE copolymer has a dynamic viscosity at a shear rate of 1 s$^{-1}$ of at most 100 Pa × sec at a temperature of 280° C.

21. An article comprising the multi-phase thermoplastic fluoropolymer composition according to claim 19.

22. A multi-phase thermoplastic fluoropolymer composition, comprising:
at least one thermoplastic fluoropolymer, polymer (A); and
from 0.1 to 3% by weight of (A) of at least one melt-processible perfluoropolymer, polymer (B),
wherein the polymer (B) is present in the composition in phase-separated domains in a continuous phase mainly comprising polymer (A), at least 75% by volume of said domains having maximal dimension not exceeding 1 µm and said polymer (B) is in the form of particles having an average primary particle size not exceeding 300 nm, and
wherein the polymer (B) is a tetrafluoroethylene (TFE)/perfluoromethylvinylether (MVE) copolymer consisting essentially of:
from 7 to 23% wt of recurring units derived from MVE; and
from 93 to 77% wt of recurring units derived from TFE.

23. The composition of claim 22, wherein the TFE/MVE copolymer has a dynamic viscosity at a shear rate of 1 s$^{-1}$ of at most 100 Pa × sec at a temperature of 280° C.

* * * * *

UNITED STATES PATENT AND TRADEMARK OFFICE
CERTIFICATE OF CORRECTION

| | | |
|---|---|---|
| PATENT NO. | : 7,855,254 B2 | Page 1 of 1 |
| APPLICATION NO. | : 11/912250 | |
| DATED | : December 21, 2010 | |
| INVENTOR(S) | : Julio Abusleme et al. | |

It is certified that error appears in the above-identified patent and that said Letters Patent is hereby corrected as shown below:

Column 26, line 11, Claim 17, "tion according to Claim 1, wherein said polymer B in the form" should read --tion according to Claim 1, wherein said polymer B is in the form--

Column 26, line 12, Claim 17, "of particles having an average primary size less than 200 nm." should read --of particles having an average primary particle size less than 200 nm.--

Column 26, line 14, Claim 18, "tion according to Claim 1, wherein said polymer B in the form" should read --tion according to Claim 1, wherein said polymer B is in the form--

Column 26, line 15, Claim 18, "of particles having an average primary size less than 150 nm." should read --of particles having an average primary particle size less than 150 nm.--

Signed and Sealed this
Twenty-second Day of March, 2011

David J. Kappos
*Director of the United States Patent and Trademark Office*